United States Patent Office 3,161,575
Patented Dec. 15, 1964

3,161,575
COPPER PYROPHOSPHATE ELECTROPLATING SOLUTIONS
Frederick Herbert Wells, Erdington, Birmingham, and Derek Martin Lyde, Stourbridge, England, assignors, by mesne assignments, to Albright & Wilson (Mfg.) Limited, Oldbury, near Birmingham, Warwickshire, England, a British company
No Drawing. Filed July 20, 1961, Ser. No. 125,363
Claims priority, application Great Britain July 23, 1960
14 Claims. (Cl. 204—52)

This invention is concerned with improvements in or relating to pyrophosphate copper-electroplating solutions.

According to one aspect of the present invention there is provided a copper-electroplating solution containing the complex $X_6Cu(P_2O_7)_2$, X being an alkali metal, and an alkali metal pyrophosphate, together with at least 0.5 p.p.m. of an additive containing the grouping

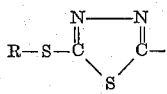

where R is hydrogen or a metal.

According to another aspect of the present invention there is provided an aqueous solution from which copper can be deposited electrolytically, made by dissolving a copper salt and an alkali metal pyrophosphate in sufficient quantities to produce the complex $X_6Cu(P_2O_7)_2$, where X is the alkali metal, and to leave an excess of alkali metal pyrophosphate, and from 0.5 p.p.m. to saturation of an additive containing a 5-mercapto-1:3:4-thiadiaz-2-yl radical.

The invention stems from the discovery that bright and smooth deposits of copper can be produced by electrodeposition from pyrophosphate copper-electroplating solutions containing, as additives, the mercaptothiadiazoles referred to above.

The additive is preferably of the formula:

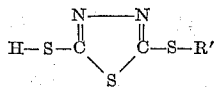

where R' is H, $CH_3$, $n$-$C_4H_9$,

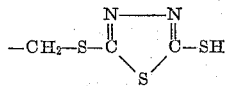

or

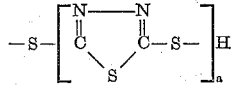

$a$ being a low integer.

The second and third of these compounds: 2-mercapto-5-methylmercapto-1:3:4-thiadiazole and 2-mercapto-5-n-butylmercapto-1:3:4-thiadiazole, may be prepared by the reactions between the monosodium salt of 2:5-dimercapto-1:3:4-thiadiazole and the appropriate alkyl halides, preferably the iodides, e.g., methyl iodide and n-butyl iodide respectively. The fourth compound: 2:2'-(dimercaptomethane)-bis-(5-mercapto-1:3:4-thiadiazole) may be prepared by the reaction between the monosodium salt of 2:5-dimercapto-1:3:4-thiadiazole and methylene di-bromide, whilst a compound of the fifth formula: bis-2:2'-(5-mercapto-1:3:4-thiadiazyl) disulphide ($a$ having the value 1), together with some other compounds of the fifth formula in which $a$ is greater than 1, may be prepared by the reaction between 2:5-dimercapto-1:3:4-thiadiazole with iodine.

The concentration of copper in the solution is not critical and may vary from less than 1 gm./liter to saturation. A preferred concentration is, however, between 25 and 30 gms./liter. Further, although any of the alkali metals may be used it is preferred to use potassium or sodium. The molar ratio of pyrophosphate to copper in the solution is necessarily greater than 2.0:1 as there is pyrophosphate in the solution additional to that in the complex $X_6Cu(P_2O_7)_2$. The ratio is preferably not greater than 2.5:1 and is preferably not less than 2.3:1.

The solution may be acid or alkaline, but if acid the pyrophosphate tends to become converted into orthophosphate making the process uneconomical. Further, if the pH is greater than about 12 or 13 copper hydroxide is precipitated. The preferred range of pH is 7.5 to 9.5, and the best results are usually obtained with a pH of substantially 8.5.

Other materials may be included in the solution. Ammonia, for example, may be added to promote anode dissolution during electrodeposition, and is preferably present in a concentration of between 1 and 3 gms./liter. For the same purpose there may be included an aliphatic carboxylic acid, such as citric acid, tartaric acid or oxalic acid, or there may be included an alpha-amino acid. In addition to promoting anode dissolution, the carboxylic acids have the effect of increasing the range of current density which may be used to obtain electrodeposits of good appearance and mechanical properties. The useful range of current density may be further extended by addition of nitric acid, nitrite ions or nitrate ions. The nitrite or nitrate ions are usually added in the form of potassium or sodium salts.

From another aspect the invention consists in materials comprising a copper salt, an alkali metal pyrophosphate and a compound containing the grouping:

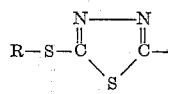

where R is hydrogen or a metal, such materials being soluble in water to produce a solution in accordance with either of the aspects of the invention hereinbefore set forth.

The solution may conveniently be prepared from the material by dissolving the alkali metal pyrophosphate, preferably in the form of anhydrous tetrasodium or tetrapotassium pyrophosphate, in water and then adding the copper salt, preferably copper pyrophosphate. If ammonia is to be included this is added next and is followed by the additive, which preferably has been dissolved in a solution of potassium hydroxide. The pH of the solution may be adjusted by adding pyrophosphoric acid, tetraphosphoric acid or nitric acid, or by adding sodium hydroxide, potassium hydroxide or ammonia solution.

From yet another aspect the invention consists in a method of coating a metallic article with copper comprising immersing the article in a solution in accordance with either of the first two aspects of the invention hereinbefore set forth, and passing an electric current through the solution with the article as a cathode.

Copper may be deposited on any of the usual basis metals such as iron, steel, copper and copper alloys, nickel and lead; further, when the alkalinity of the solution is relatively low, as is that of the preferred solution, copper may be deposited on light metals such as aluminium and zinc.

Deposits of copper for decorative purposes would normally be up to about 0.002 inch thick, but much thicker deposits may be produced, as for electroforming purposes, which may be from 0.002 inch to one inch thick or even thicker. Little or no mechanical after-treatment of the copper is normally needed after deposition for electroforming.

The temperature of the solution is preferably between 95° and 140° F. and the most satisfactory range of temperature has been found to be between 130° and 140° F.

The current density is not critical but the appearance of the deposit is found to vary with the current density employed. Below a current density of about 5 amps./sq. ft. the deposit is usually light pink in colour, and above a current density of about 60 amps./sq. ft. the deposit is often found to be dull and may be powdery and non-adherent. In general the higher is the copper content of the solution, the higher is the maximum current density which can be employed. Current densities of up to 80 amps./sq. ft. have been successfully employed, but when using a cathode of irregular shape it has been found virtually impossible to achieve satisfactory deposition using a current density of above 60 amps./sq. ft.

The anodes are preferably prepared from electrolytic copper, phosphorus de-oxidised copper or oxygen-free high conductivity (OFHC) copper.

The electro-deposition may conveniently be carried out in a rubber-lined mild steel tank fitted with a stainless steel steam-heating coil and an air agitation coil of a plastics material.

Typical solutions may comprise:

| | | |
|---|---|---|
| Copper pyrophosphate | gms./liter | 85–100 |
| Tetrasodium phosphate | do | 250–300 |
| or | | |
| Tetrapotassium phosphate | do | 300–400 |
| Ammonia | do | 1– 3 |
| Additive | p.p.m | 10 |

The following examples include details of actual experiments.

(1) After preliminary cleaning a zinc-alloy diecasting was "strike-plated" in the conventional way and then plated in a pyrophosphate copper-electroplating solution of the following composition:

| | | |
|---|---|---|
| Copper pyrophosphate ($Cu_2P_2O_7 \cdot 3H_2O$) | gms./liter | 90.2 |
| Tetrapotassium pyrophosphate (anhydrous) | do | 345.2 |
| Ammonia ($NH_3$) | do | 2.0 |
| 2:5-dimercapto-1:3:4-thiadiazole | p.p.m | 2.2 | the pH of the solution was 8.9, the current density was 60 amps./sq. ft. nominal and the temperature was 130° F. A deposit of copper 0.0003 inch thick was obtained after 5 minutes' plating time. The deposit was bright and well levelled, and was suitable for nickel plating without any mechanical polishing.

In a similar experiment, under the same conditions except that the time of plating was extended to 8.5 minutes, the deposit was 0.0005 inch thick.

(2) After preliminary cleaning a metal article was plated in a solution of copper pyrophosphate and tetrapotassium pyrophosphate containing

| | | |
|---|---|---|
| Copper | gms./liter | 30 |
| Pyrophosphate | do | 200 |
| Ammonia ($NH_3$) | do | 2 |
| Bis-2:2'-(5-mercapto-1:3:4-thiadiazyl) disulphide | p.p.m | 5 |

The pH of the solution was 8.7 and the temperature maintained between 130° and 140° F. The current density was 40 amp./sq. ft. and after 2 hours a bright smooth deposit of copper was formed approximately 0.004 inch thick.

Similar results were obtained when the additive was replaced with the following additives:
(a) 2-mercapto-5-methylmercapto-1:3:4-thiadiazole
(b) 2-mercapto-5-n-butylmercapto-1:3:4-thiadiazole
(c) 2:2'-(dimercaptomethane)-bis-(5-mercapto-1:3:4-thiadiazole).

We claim:
1. The method of electroplating a bright, well-levelled deposit of copper upon a metal substrate which comprises:
 (a) providing an aqueous solution having a pH between about 7.5 to 9.5 containing dissolved therein:
  (1) a copper salt complex of the formula

$$X_6Cu(P_2O_7)_2$$

where X is alkali metal,
  (2) alkali metal pyrophosphate, and
  (3) from 0.5 p.p.m. to saturation of an additive having the formula:

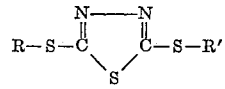

wherein R is selected from the group consisting of hydrogen and metal atoms, and
  R' is selected from the group consisting of hydrogen, metal atoms, alkyl radicals of 1 to 4 carbon atoms, and radicals of the formula:

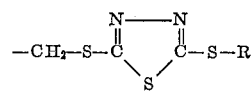

(b) maintaining the temperature of said solution at between about 95° to 140° F.,
 (c) placing a metal substrate in said solution, and
 (d) passing a D.C. electric current of a current density between about 5 to 60 amps./sq. ft. through the solution between said metal substrate as a cathode and a copper anode until a copper deposit of the desired thickness is formed upon the metal substrate.

2. In the method of electrodepositing copper on metal substrates from an alkaline copper pyrophosphate electroplating bath, the improvement which comprises including in the bath as an additive to improve leveling and brightness of the deposited copper layer from 0.5 p.p.m. to saturation of a heterocyclic organic compound selected from the group consisting of:

2,5-dimercapto-1,3,4-thiadiazole
2-mercapto-5-methylmercapto-1,3,4-thiadiazole
2-mercapto-5-n-butylmercapto-1,3,4-thiadiazole
2,2'-(dimercaptomethane)-bis-(5-mercapto-1,3,4-thiadiazole, and
bis-2,2'-(5-mercapto-1,3,4-thiadiazyl) disulfide.

3. The method of electroplating a bright, well-levelled deposit of copper upon a metal substrate which comprises:
 (a) providing an aqueous solution having a pH between about 7.5 to 9.5 containing dissolved therein:
  (1) a copper salt,
  (2) an alkali metal pyrophosphate in an amount at least sufficient to form with said copper salt the complex $X_6Cu(P_2O_7)_2$, where X is alkali metal, and
  (3) an additive containing the moiety

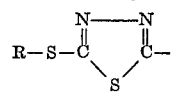

wherein R is selected from the group consisting of hydrogen and metal atoms,
 (b) maintaining the temperature of said solution at between about 95° to 140° F.,
 (c) placing a metal substrate in said solution, and
 (d) passing a D.C. electric current of a current density between about 5 to 60 amps./sq. ft. through the solution between said metal substrate as a cathode and a copper anode until a copper deposit of the desired thickness is formed upon the metal substrate.

4. A copper-electroplating solution from which a bright, well-levelled deposit of copper may be electrodeposited upon a metal substrate suitable for nickel plating without mechanical polishing, said solution consisting essentially of the following ingredients dissolved in water in the amounts as specified:

| | |
|---|---|
| Copper pyrophosphate trihydrate ____gms./liter__ | 90.2 |
| Tetrapotassium pyrophosphate _____do____ | 345.2 |
| Ammonia _____do____ | 2.0 |
| 2,5-dimercapto-1,3,4-thiadiazole _____p.p.m__ | 2.2 |

5. An aqueous solution for electroplating metal substrates with copper which contains dissolved therein:
 (a) a copper salt
 (b) an alkali metal pyrophosphate in an amount at least sufficient to form with said copper salt the complex $X_6Cu(P_2O_7)_2$, where X is alkali metal, and
 (c) an additive containing the moiety

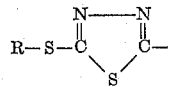

wherein R is selected from the group consisting of hydrogen and metal atoms.

6. An aqueous solution for electroplating a metal substrate with copper consisting essentially of the following ingredients dissolved in water in the amounts specified:

| | |
|---|---|
| Copper pyrophosphate _____gms./liter__ | 85–100 |
| Tetra-sodium pyrophosphate _____do____ | 250–300 |
| Ammonia _____do____ | 1–3 |
| An additive as defined in claim 1 _____p.p.m__ | 10 |

7. An aqueous solution for electroplating a metal substrate with copper consisting essentially of the following ingredients dissolved in water in the amounts specified:

| | |
|---|---|
| Copper pyrophosphate _____gms./liter__ | 85–100 |
| Tetrapotassium pyrophosphate _____do____ | 300–400 |
| An additive as defined in claim 1 _____p.p.m__ | 10 |

8. An aqueous solution for electroplating a metal substrate with copper consisting essentially of copper pyrophosphate, tetrapotassium pyrophosphate, ammonia and bis-2,2'-(5-mercapto-1,3,4-thiadiazyl) disulfide dissolved in water to provide the following concentrations of solution ingredients:

| | |
|---|---|
| Copper _____gms./liter__ | 30 |
| Pyrophosphate _____do____ | 200 |
| Ammonia _____do____ | 2 |
| Said disulfide _____p.p.m__ | 5 |

9. An aqueous solution as claimed in claim 5 which also contains at least one further additive selected from the group consisting of ammonia, aliphatic carboxylic acids, alpha-amino acids, nitrite ions and nitrate ions.

10. An aqueous solution for electroplating metal substrates with copper which has a pH of from 7.5 to 9.5 and contains dissolved therein:
 (a) a copper salt,
 (b) an alkali metal pyrophosphate selected from the group consisting of sodium and potassium pyrophosphates in an amount at least sufficient to provide a molar ratio of pyrophosphate to copper of between about 2.0:1 and 2.5:1 and a concentration of copper pyrophosphate of from 85 to 100 grams per liter, and
 (c) from 0.5 part per million to saturation of an additive of the formula:

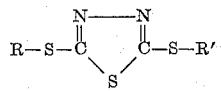

wherein R is selected from the group consisting of hydrogen and metal atoms and R' is selected from the group consisting of hydrogen and metal atoms, alkyl radicals having from 1 to 4 carbon atoms, and radicals of the formula:

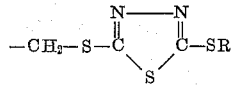

11. An aqueous solution as claimed in claim 5 wherein said additive is present in an amount of at least 0.5 p.p.m.

12. A water-soluble solid composition which comprises:
 (a) a water-soluble copper salt,
 (b) an alkali metal pyrophosphate in an amount at least sufficient to form with the said copper salt the complex $X_6Cu(P_2O_7)_2$, where X is alkali metal, and
 (c) an additive containing the moiety:

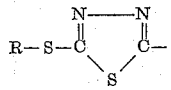

wherein R is selected from the group consisting of hydrogen and metal atoms.

13. A water-soluble solid composition as claimed in claim 12, wherein the said additive is of the formula:

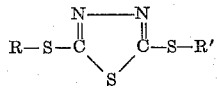

wherein R is selected from the group consisting of hydrogen and metal atoms, and
R' is selected from the group consisting of hydrogen and metal atoms, alkyl radicals of 1 to 4 carbon atoms, and radicals of the formula:

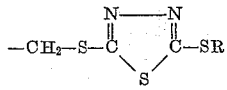

14. A solid composition as claimed in claim 13 wherein the said alkali metal pyrophosphate is selected from the group consisting of sodium and potassium pyrophosphates and is present in an amount sufficient to provide a molar ratio of pyrophosphate to copper of between about 2.0:1 and 2.5:1.

References Cited in the file of this patent

UNITED STATES PATENTS

| | | |
|---|---|---|
| 2,462,870 | Keller _____ | Mar. 1, 1949 |
| 2,489,538 | Phillips _____ | Nov. 29, 1949 |
| 2,493,092 | Stareck _____ | Jan. 3, 1950 |
| 2,858,318 | Stoll et al. _____ | Oct. 28, 1950 |
| 2,609,339 | Passal _____ | Sept. 2, 1952 |
| 2,663,684 | Pierce _____ | Dec. 22, 1953 |
| 2,849,352 | Kirstahler et al. _____ | Aug. 26, 1958 |
| 2,914,535 | D'Amico _____ | Nov. 24, 1959 |